United States Patent
Olbricht et al.

(10) Patent No.: US 6,542,676 B2
(45) Date of Patent: Apr. 1, 2003

(54) METHOD FOR LOCATING A LARGE NUMBER OF FIBRE ENDS IN A PRE-DETERMINED POSITION

(75) Inventors: Kai Olbricht, Wesel (DE); Markus Schuster, Mainz (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/990,931

(22) Filed: Nov. 14, 2001

(65) Prior Publication Data

US 2002/0102080 A1 Aug. 1, 2002

(30) Foreign Application Priority Data

Nov. 16, 2000 (DE) .......................................... 100 57 127

(51) Int. Cl.[7] ................................................ G02B 6/04
(52) U.S. Cl. ........................................ 385/115; 385/52
(58) Field of Search ............................... 385/25, 26, 52, 385/115–121, 136, 137, 139

(56) References Cited

U.S. PATENT DOCUMENTS

| | | | | |
|---|---|---|---|---|
| 5,346,583 A | * | 9/1994 | Basavanhally | 156/273.3 |
| 5,394,498 A | * | 2/1995 | Hinterlong et al. | 264/1.1 |
| 5,907,650 A | * | 5/1999 | Sherman et al. | 385/63 |
| 6,072,932 A | * | 6/2000 | Bennett et al. | 385/139 |
| 6,393,187 B1 | * | 5/2002 | Engelberth et al. | 385/115 |
| 6,396,995 B1 | * | 5/2002 | Stuelpnagel et al. | 385/115 |
| 6,408,120 B1 | * | 6/2002 | Dautartas | 385/18 |
| 2001/0051028 A1 | * | 12/2001 | Gutierrez et al. | 385/85 |
| 2002/0015920 A1 | * | 2/2002 | Steinberg | 430/321 |

FOREIGN PATENT DOCUMENTS

| | | | | |
|---|---|---|---|---|
| JP | 59-121983 A | * | 7/1984 | H01L/31/12 |
| JP | 04-288507 A | * | 10/1992 | G02B/6/06 |
| WO | WO 02/06871 A1 | * | 1/2002 | G02B/6/08 |

* cited by examiner

*Primary Examiner*—Akm E. Ullah
*Assistant Examiner*—Michelle R. Connelly-Cushwa
(74) *Attorney, Agent, or Firm*—Baker & Daniels

(57) ABSTRACT

The invention concerns a method for locating a large number of fibre ends of a bundle of optical fibres, in particular glass, quartz or synthetic fibres, into a number of pre-determined positions encompassing the following steps:

Figure 1:
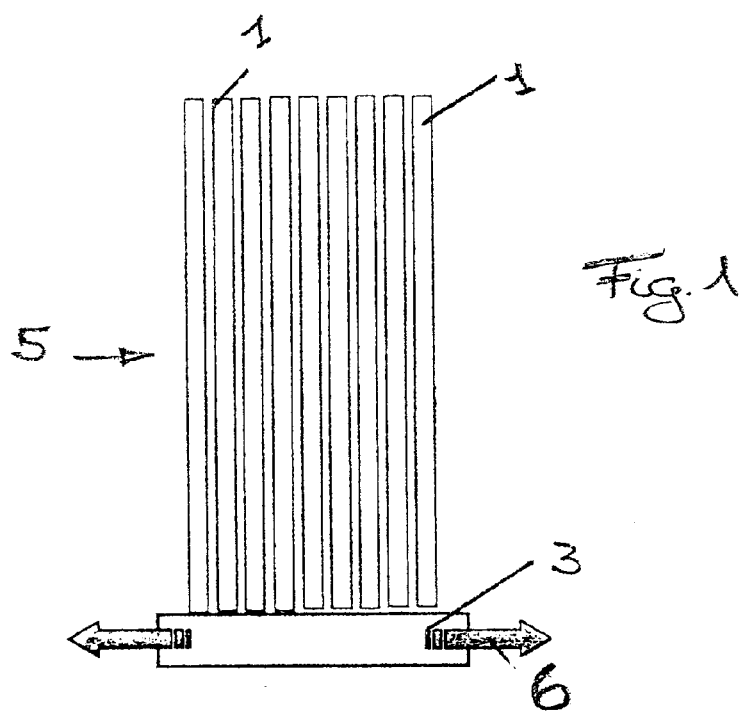

the glass, quartz or synthetic fibres are brought to bear against a fixing device encompassing a multitude of apertures for the glass, quartz or synthetic fibre ends, the fixing device and/or the multitude of glass, quartz or synthetic fibre ends protrude through the apertures of the fixing device in such a way that the glass, quartz or synthetic fibre ends are located in the pre-determined position.

20 Claims, 2 Drawing Sheets

METHOD FOR LOCATING A LARGE NUMBER OF FIBRE ENDS IN A PRE-DETERMINED POSITION

The invention concerns a method for locating a large number of fibre ends in a bundle of optical waveguides, in particular glass, quartz or synthetic fibres, into a number of pre-determined positions and a method for producing a glass, quartz or synthetic fibre end which can be coupled with a plug-in device.

In the case of optical fibre cables with a large number of optical fibres it has previously been customary to grip the individual fibres manually and to locate them individually in a pre-determined position.

In this manner for instance, optical fibres lying side by side could be arranged in a uni-dimensional array and coupled with the plug-type connection of an optical fibre cable.

A disadvantage of a procedure of this nature is that this procedure for positioning many glass, quartz, or synthetic fibres accurately is extremely time-consuming and costly.

In particular, a method such as this did not allow a two-dimensional optical fibre array with, for instance, 2×2 to 40×40 optical fibres to be located in a plug connector in such a way that an optical fibre cable with a large number of optical fibres could terminate in a two-dimensional matrix, which is for instance quadratic or rectangular. In particular, the methods representing the current state of the art did not allow exact positioning within a range of just a few micrometers ($\mu$m) of a very large number of optical fibre ends with minimal spacing.

The aim of the invention is thus to provide a method with which these disadvantages can be overcome, and in particular a method which makes very accurate positioning in a two-dimensional matrix possible with the distance between fibre ends being only a few $\mu$m.

In particular, this method is designed to simplify the point-to-point alignment of two optical fibre ends. Moreover, the method is designed to allow the manufacture of fibre optic cables to be largely automated.

In accordance with the invention this is achieved by bringing the ends of the fibres in contact with a fixing device encompassing a large number of apertures for the ends of the fibres and by moving the fixing device or the ends of the fibres or the fixing device and the end of the fibres in such a way that the ends of the fibres protrude through the aperture of the fixing device as a result of the movement and therefore reach the position pre-determined by the apertures, for instance, within a two-dimensional matrix.

The advantage of such a solution is in particular that the individual fibres can be positioned in extreme proximity to one another, due to the fact that by using such a method very narrow spacings, such as those pre-determined for instance by the width of the spacers in the fixing device, do not present any problems in terms of the positioning.

By using the method in accordance with the invention, the ends of optical fibres can be positioned with <±2 $\mu$m accuracy, with the individual optical fibres comprising core, cladding and protective sheath capable of having a diameter 20 $\mu$m, especially of 100 $\mu$m to 1000 $\mu$m especially 260 $\mu$m. The stripped ends of the optical fibres, without their protective sheath and consisting of core and cladding, can have a diameter ranging from 50 to 800 $\mu$m.

It is particularly advantageous if the ends of the optical fibres and/or the fixing device are/is moved periodically, and in particular caused to oscillate. This can occur for instance by means of vibration.

A possible embodiment of the fixing device consists in its configuration as an apertured plate, with the individual apertures being formed by the spacers which are separated by a fixed distance.

In the case of an apertured plate of this kind it is advantageous if the distance between the spacers separating the individual apertures is selected in such a way that precisely only one single end of a fibre can fit through the aperture.

As an alternative to a fixing device with fixed pre-determined aperture dimensions, it is also possible to create a fixing device which provides for the size of the apertures to be varied within a pre-determined range by means of flexible spacers. A fixing device of this type allows the individual fibres to be initially inserted into relatively wide apertures. However, the width of these apertures may only be chosen such that they only just prevent the entry of a second fibre. The size of the apertures is reduced after the individual fibres have been inserted in order to position the individual fibres accurately.

A solution of this nature has the advantage over and above the fixed matrix that it is virtually impossible for individual fibres not to pass through the apertures, making it unnecessary to reposition them in a time-consuming and expensive follow-up process in the usual manner.

Another advantage lies in the fact that the optical fibres can also be fed through several such fixing devices, with the width of the apertures of the individual fixing devices being individually adjustable.

In particular, the advantage lies in the fact that by inserting the fibres through as many plates as possible, the selection involved in the insertion procedures is reduced. In order to isolate individual cables each consisting of two apertured plates, the plates can then be drawn apart.

In addition to the positioning method in accordance with the invention, in particular the invention also provides a method for producing the end of an optical fibre which can be coupled with a plug-in connector and which encompasses a large number of individual optical fibres.

It is only with coupling technology of this kind that it becomes possible to provide an optical fibre cable with a two-dimensional optical fibre array for the manufacturing effort and expense which is justifiable and which could for instance be employed in the field of optical data communication.

The method for manufacturing the end of an optical fibre in accordance with the invention permitting it to be coupled with a connecting device encompasses the stage of positioning the individual optical fibres with the aid of the method in accordance with the invention, the initial attachment of the ends of the fibres, and their positioning and final attachment. The final attachment of the ends of the fibres can be achieved for instance by filling them with a filling compound and then curing. This final attachment can for instance be integrated into a connector plug.

After inserting such an end of an optical fibre cable into a connecting device, it is advantageous for acceptable optical quality for the optical fibres which are now arranged within a two-dimensional matrix to be ground and polished so that an optical fibre array results which is arranged in one plane.

For accurate positioning it is advantageous if the individual optical fibres which are arranged in an optical fibre array do not have a protective sheath, i.e. the ends of the optical fibres consist solely of the optical fibre core and the cladding.

Synthetic material and/or adhesive is preferred as the filling compound.

The invention shall be described below with reference to examples of the embodiments. Although the following examples of embodiments refer to glass optical fibres as the optical waveguides, the method in accordance with the invention can be applied to any other form of optical waveguide, for instance quartz or synthetic fibres without deviating from the invention.

Figure 3:
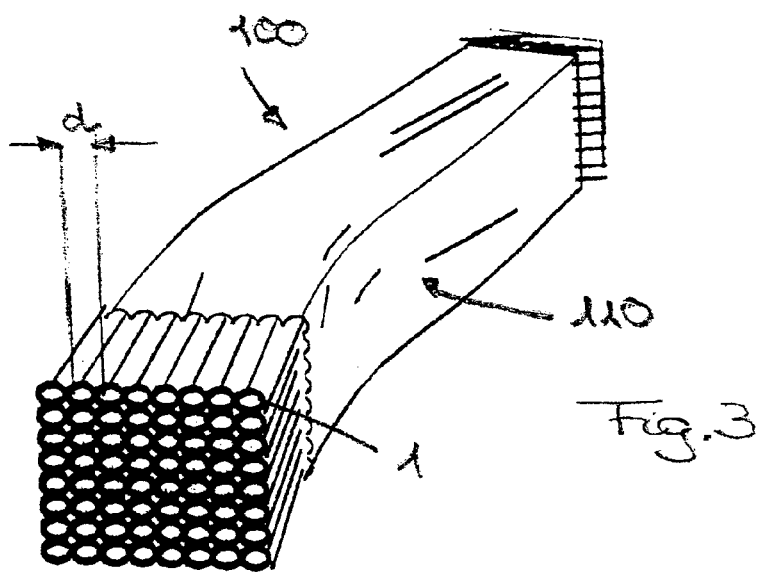
Figures 2A, 2B:
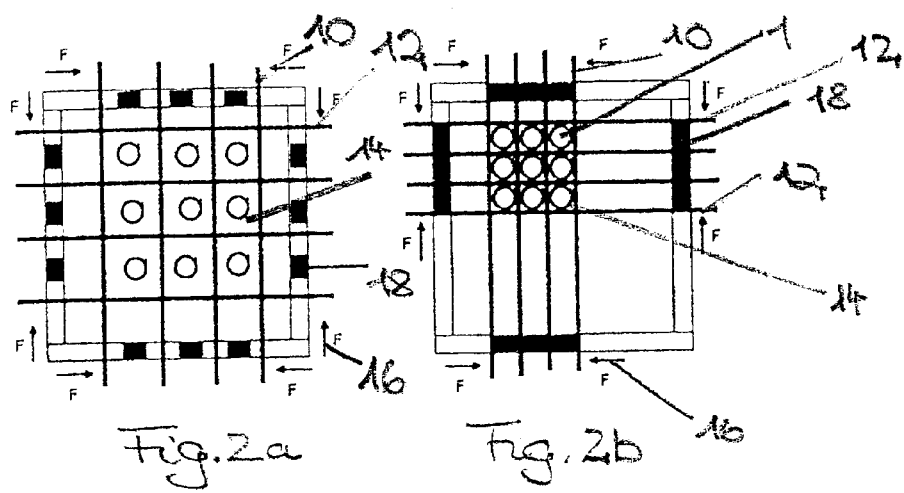

In the drawing:

FIG. 1 shows the design for executing the method in accordance with the invention to position the glass fibres by means of movement FIGS. 2a and 2b shows an apertured plate with flexible apertures and spacers which ensure a specified distance in their compressed state FIG. 3 shows an optical fibre cable produced by means of the method in accordance with the invention with a large number of optical fibres arranged in a two-dimensional matrix.

FIG. 1 shows the functionality of the method in accordance with the invention in order to position a large number of optical fibre elements by employing an embodiment of the device.

Clearly evident are the numerous optical fibre ends 1 of the optical fibre cable. Each individual optical fibre of the optical fibre cable consists of an optical fibre core, the so-called cladding or glass sheath and a protective sheath which surrounds the cladding or glass sheath.

In order to position the individual ends of the optical fibres by employing the method in accordance with invention, the protective sheath in the area of the fibre ends are removed. The individual ends of the optical fibre are positioned against a fixing device 3 which is designed here as an apertured plate with spacers, with the spacers having a specified distance between them, such that an aperture is formed with a constant aperture diameter.

The size of the aperture is dimensioned in such a way that only a maximum of one fibre end can pass through such an aperture.

The bundle 5 of fibre ends 1 is positioned against the apertured plate 3. Then the bundle of optical fibre ends 1 and/or the apertured plate 3 are moved as indicated by the arrow 6, for instance caused to vibrate, so that the individual optical fibre ends protrude through the apertures, are positioned and are initially fixed in position by the apertures of the plate after their protrusion through them.

In the ideal case, 100% of the stripped fibres, that is the fibres without protective sheathing at their ends, fall through the apertures and fill these.

If not all apertures are filled and individual fibres of the numerous optical fibres are not protruding through the apertured plate, these individual fibres can be worked manually at a later time.

After the individual optical fibres have been initially fixed in the specified position by the apertured plate, the protruding optical fibre ends are fixed permanently in position by means of a filling compound in a matrix which is arranged in a pre-determined manner by the apertures in the apertured plate. The preferred embodiment involves the fibre ends being filled with a synthetic material/adhesive and then cured. This results in the final attachment of the fibre ends in the desired position.

In conclusion, the end of the cable produced in such a manner can be ground and polished in such a way that the result is a single-plane fibre array.

Instead of an perforated diaphragm with pre-determined aperture dimensions, a flexible matrix would also be conceivable.

A possible embodiment of a flexible matrix of this kind is shown in FIGS. 2a and 2b.

The flexible matrix consists of a system of intersecting spacers 10, 12 which define a large number of apertures 14 in a matrix structure. The distance between the spacers is dimensioned in such a way that the apertures 14 just prevent a second fibre from intruding. In accomplishing this, it must be taken into account that this is only possible if the protective sheath of the fibre amounts to less than 50% of the overall diameter of the fibre.

After the individual fibres have been inserted into the apertures 14 of the flexible matrix by vibration or manual insertion, the flexible spacers are moved in the direction of the arrow 16 to the limit stop 18. This is shown in FIG. 2b.

The individual optical fibre ends are then packed tightly into a matrix and the spacing between them corresponds to the width of the individual spacers 10, 12.

In the same manner as in the case of the method employing rigid apertures, when a flexible matrix is employed it is filled with a compound after the preliminary positioning by the fixing device and then the cable ends which are coupled with a plug connector are ground to size and polished.

If one wishes to construct an optical fibre cable with a plug connector at both ends, the fibre bundles are produced in the manner previously described.

FIG. 3 shows an example of an optical fibre cable 100 which has been manufactured in accordance with the method in accordance with the invention. The optical fibre cable 100 encompasses a large number of optical fibre ends 1, arranged in an array. The size of the array can for instance be 10×10 or 35×35 optical fibres or a non-quadratic optical fibre array, for instance with 16×32 optical fibres. The spacing d between the individual fibre cores is 125 $\mu$m in the embodiment here and the spatial deviation tolerance ±2 $\mu$m. The individual optical fibres consist of an optical fibre core with a diameter of approximately 50 $\mu$m, cladding which surrounds the optical fibre core, and a protective sheath. The optical fibre cable with the protective sheath has a diameter of approximately 100 to 120 $\mu$m. Of course, arrays with other geometric constellations or with optical fibres of other dimensions are also conceivable, without there being any deviation from the concept of the invention.

The large number of optical fibres is surrounded by a sheath 110.

The optical fibre material can be quartz glass, other forms of glass or a synthetic material. The surface of the optical fibre is encompassed for instance by an acrylate coating. Not only multimode but also single mode fibres can be employed.

A complete optical fibre cable results when a plug connector is attached to both ends of the optical fibre array.

Using the method in accordance with the invention makes it possible for the first time to manufacture an optical fibre cable of glass, quartz or synthetic fibres which encompasses a multidimensional matrix of the dimensions and precision described in an orderly arrangement.

What is claimed is:

1. A method for locating a large number of fibre ends (1) of a bundle (5) of optical fibres, in particular of glass, quartz or synthetic fibres, in a large number of pre-determined positions, encompassing the following steps:

the glass, quartz or synthetic fibre ends (1) are brought to bear against a fixing device (3) encompassing a multitude of apertures for the glass, quartz or synthetic fibres the fixing device (3) and/or the large number of glass, quartz or synthetic fibre ends (1) are moved in such a way that the glass, quartz or synthetic fibre ends (1) protrude through the apertures of the fixing device (3) in such a way that the glass, quartz or synthetic fibre ends are located in the pre-determined position, wherein the glass, quartz or synthetic fibre ends (1) and/or the fixing devices (3) are moved periodically, and in particular, set in vibrational motion.

2. A method in accordance with claim 1, characterised by the fact that the fixing device (3) encompasses at least one rigid matrix with apertures (14), and in particular an apertured plate.

3. A method in accordance with claim 2, characterised by the fact that the matrix includes a plurality of spacers and spacing between the spacers in the matrix is fixed and selected in such a way that only exactly one fibre end (1) can protrude into the aperture (14).

4. A method in accordance with claim 3 characterised by the fact that the spacing of the spacers (10, 12)<100 $\mu$m.

5. A method in accordance with claim 4, characterized by the fact that the fibre ends are fibres without a protective coating.

6. A method in accordance with claim 3, characterized by the fact that the fibre ends are fibres without a protective coating.

7. A method in accordance with claim 2, characterized by the fact that the fibre ends are fibres without a protective coating.

8. A method in accordance with claim 1, characterised by the fact that the fixing device encompasses at least one flexible matrix with apertures, wherein the size of the apertures can be varied within a pre-determined range.

9. A method in accordance with claim 8, characterized by the fact that the fibre ends are fibres without a protective coating.

10. A method in accordance with claim 1, characterised by the fact that the fibre ends are fibres without a protective coating.

11. A method in accordance with claim 10 characterised by the fact that the protective coating of the fibres amounts to less than 50% of the overall diameter of the fibre.

12. A method in accordance with claim 1, characterized by the fact that the fixing device (3) encompasses at least one rigid matrix with apertures (14), and in particular an apertured plate.

13. A method in accordance with claim 1, characterized by the fact that the fixing device encompasses at least one flexible matrix with apertures, wherein the size of the apertures can be varied within a pre-determined range.

14. A method in accordance with claim 1, characterized by the fact that the fibre ends are fibres without a protective coating.

15. A method for locating a large number of fibre ends (1) of a bundle (5) of optical fibres, in particular of glass, quartz or synthetic fibres, in a large number of pre-determined positions, encompassing the following steps:

the glass, quartz or synthetic fibre ends (1) are brought to bear against a fixing device (3) encompassing a multitude of apertures for the glass, quartz or synthetic fibres the fixing device (3) and/or the large number of glass, quartz or synthetic fibre ends (1) are moved in such a way that the glass, quartz or synthetic fibre ends (1) protrude through the apertures of the fixing device (3) in such a way that the glass, quartz or synthetic fibre ends are located in the pre-determined position, wherein the fixing device (3) encompasses at least one flexible matrix with apertures (14), wherein the size of the apertures can be varied within a pre-determined range.

16. A method for the production of a glass, quartz or synthetic fibre end which can be coupled with a plug connector and which constitutes part of a glass, quartz or synthetic fibre cable encompassing a multitude of individual fibres employing the following steps:

the fibre ends are positioned into a pre-determined position, with the positioning of the vast majority of fibre ends of the large number of individual fibres of the glass, quartz or synthetic fibre cable being executed by means of a method in accordance with one of the claims 1 to 4,8 and 15 the fibre ends are initially attached after positioning, the fibre ends are attached permanently in the pre-determined position.

17. A method in accordance with claim 16 characterised by the fact that the final attachment in position is achieved by filling and then curing, with the filling employing synthetic material and/or adhesive as the filling compound.

18. A method in accordance with claim 17, characterized by the fact that the fibre ends are fibres without a protective coating.

19. A method in accordance with claim 16, characterised by the fact that the glass, quartz or synthetic fibre end is ground and polished to produce a glass, quartz or synthetic fibre array.

20. A method in accordance with claim 16, characterized by the fact that the fibre ends are fibres without a protective coating.

* * * * *